(12) United States Patent
Yu et al.

(10) Patent No.: US 10,319,956 B2
(45) Date of Patent: Jun. 11, 2019

(54) POUCH CASE FOR SECONDARY BATTERY AND POUCH-TYPE SECONDARY BATTERY COMPRISING THE SAME

(71) Applicant: LG CHEM, LTD., Seoul (KR)

(72) Inventors: Hyung Kyun Yu, Daejeon (KR); Sang Hun Kim, Daejeon (KR); Won Pill Hwang, Daejeon (KR); Soo Ji Hwang, Daejeon (KR); Sang Suk Jung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 79 days.

(21) Appl. No.: 15/524,056

(22) PCT Filed: Nov. 19, 2015

(86) PCT No.: PCT/KR2015/012506
§ 371 (c)(1),
(2) Date: May 3, 2017

(87) PCT Pub. No.: WO2016/080797
PCT Pub. Date: May 26, 2016

(65) Prior Publication Data
US 2017/0352844 A1    Dec. 7, 2017

(30) Foreign Application Priority Data

Nov. 19, 2014  (KR) .................. 10-2014-0161852
Nov. 19, 2015  (KR) .................. 10-2015-0162529

(51) Int. Cl.
*H01M 2/02*      (2006.01)
*H01M 2/08*      (2006.01)
*H01M 10/052*    (2010.01)

(52) U.S. Cl.
CPC ............. *H01M 2/026* (2013.01); *H01M 2/02* (2013.01); *H01M 2/0275* (2013.01);
(Continued)

(58) Field of Classification Search
CPC ...... H01M 2/026; H01M 2/02; H01M 2/0275; H01M 2/0282; H01M 2/0285; H01M 2/0287; H01M 2/0295; H01M 2/08
(Continued)

(56) References Cited

U.S. PATENT DOCUMENTS 5,364,694 A    11/1994  Okada et al.
2002/0160212 A1  10/2002  Yamashita et al.
(Continued)

FOREIGN PATENT DOCUMENTS

JP    59-146166 A    8/1984
JP    5-51852 A      3/1993
(Continued)

OTHER PUBLICATIONS

Extended European Search Report, dated Aug. 10, 2017, for European Application No. 15861937.9.
(Continued)

*Primary Examiner* — Jayne L Mershon
(74) *Attorney, Agent, or Firm* — Birch, Stewart, Kolasch & Birch, LLP

(57) ABSTRACT

The present invention relates to a pouch case for a secondary battery and a pouch-type secondary battery comprising the same. More particularly, it relates to a pouch case for a secondary battery comprising an inner resin layer, a metal layer and an outer resin layer, wherein the inner resin layer comprises a porous non-woven fabric support having a plurality of pores and a polymer sealant filled in the pores of the non-woven fabric support; and a secondary battery comprising the same.

15 Claims, 3 Drawing Sheets

(52) U.S. Cl.
CPC ....... *H01M 2/0282* (2013.01); *H01M 2/0285* (2013.01); *H01M 2/0287* (2013.01); *H01M 2/0295* (2013.01); *H01M 2/08* (2013.01); *H01M 10/052* (2013.01); *H01M 2220/30* (2013.01)

(58) Field of Classification Search
USPC ........................................................ 429/176
See application file for complete search history.

(56) References Cited

U.S. PATENT DOCUMENTS

| | | |
|---|---|---|
| 2009/0186270 A1 | 7/2009 | Harada et al. |
| 2010/0216016 A1 | 8/2010 | Seino et al. |
| 2010/0221601 A1 | 9/2010 | Fukuda |
| 2012/0219847 A1* | 8/2012 | Hong .................. H01M 2/021 429/163 |
| 2014/0377636 A1 | 12/2014 | Sung et al. |
| 2015/0361249 A1* | 12/2015 | Liu ........................ B65D 65/38 428/137 |

FOREIGN PATENT DOCUMENTS

| | | | |
|---|---|---|---|
| JP | 9-279453 | A | 10/1997 |
| JP | 11-176397 | A | 7/1999 |
| JP | 2001-307688 | * | 11/2001 |
| JP | 2001-307688 | A | 11/2001 |
| JP | 2007-184189 | A | 7/2007 |
| JP | 2014-46587 | A | 3/2014 |
| KR | 10-2006-0034128 | A | 4/2006 |
| KR | 10-2010-0097820 | A | 9/2010 |
| KR | 10-2013-0063709 | A | 6/2013 |
| KR | 10-2013-0081445 | A | 7/2013 |
| KR | 10-2013-0126106 | A | 11/2013 |
| KR | 10-2014-0048602 | A | 4/2014 |
| WO | WO 2014/110780 | A1 | 7/2014 |

OTHER PUBLICATIONS

International Search Report, for PCT/KR2015/012506 (PCT/ISA/210) dated Feb. 25, 2016.

* cited by examiner

POUCH CASE FOR SECONDARY BATTERY AND POUCH-TYPE SECONDARY BATTERY COMPRISING THE SAME

CROSS-REFERENCE(S) TO RELATED APPLICATION

This application claims priority of Korean Patent Application No. 10-2014-0161852, filed on Nov. 19, 2014, and Korean Patent Application No. 10-2015-0162529, filed on Nov. 19, 2015, in the Korean Intellectual Property Office, which are hereby incorporated by reference in its entirety.

TECHNICAL FIELD

The present invention relates to a pouch case for a secondary battery and a pouch-type secondary battery comprising the same, and more particularly to a pouch case for a secondary battery, which secures stability by improving nail penetration characteristic and foreign substance resistance, and a pouch-type secondary battery comprising the same.

BACKGROUND ART

The development of techniques associated with mobile devices and increase in demand therefor have brought about rapid increase in the demand for secondary batteries as energy sources, and accordingly, studies of the secondary batteries, which can meet various demands, are being on the rise.

Among the secondary batteries, demand for prismatic type secondary batteries and pouch-type lithium secondary batteries that can be applied to products such as mobile phones and the like due to their small thickness in terms of battery shape is high, and demand for lithium cobalt polymer secondary batteries with excellent energy density, discharge voltage, and safety and in terms of materials constituting the batteries is high.

In the case of the prismatic lithium secondary battery, it is advantageous in protecting an electrode assembly from external impact and easy to a liquid injection process. However, since its shape is fixed, it is difficult to reduce the volume thereof. Thus, in the case of electrical products using this as a power source, there are limitations in their design. Also, in terms of safety, since an effect of venting gas or liquid is not smooth, internal heat and gas are accumulated. Thus, the risk of explosion may be high, and the time required to cause cell degradation may be short due to overheating because the internal heat is not effectively released.

On the other hand, in the case of the pouch-type lithium secondary battery, it has advantages in that it is particularly suitable for production of a thin cell because there are no limitations in shape and size, assembly by thermal fusion is easy, and it has high safety because the effect of venting gas or liquid is facilitated when abnormal behaviors occur. However, since it uses a thin soft laminate sheet (pouch) as a case, compared to the prismatic secondary battery, it has a disadvantage of having low stability to external impact and the like due to its weak physical and mechanical strength and low reliability of sealing.

In particular, in the case that high current flows inside of the pouch secondary battery in a short time by local crush such as exposure to high temperature, overcharging, external short, foreign substances in an electrode, nail penetration and the like, the electrode coated with an active material provides a heating source to generate heat. Accordingly, there are problems that reaction between an electrolyte and the electrode is accelerated as the battery temperature rapidly increases, thereby causing ignition of the battery, and also the secondary battery is swollen due to internal pressure of the battery increased by the gas generated by the reaction between the electrolyte and the electrode. Because this risk of explosion causes serious stability problem, it is the most fatal disadvantage of the lithium secondary battery.

Accordingly, a factor to be necessarily concerned when developing the pouch-type secondary battery is to secure stability to external impact. For this, a method for reinforcing strength of a battery by additionally forming a separate strength reinforcement layer on the surface of the conventional soft pouch case was suggested. However, in this case, because an extra strength reinforcement layer other than the pouch case should be additionally made, it has disadvantages of increase of battery size, volume and weight, and production cost of the battery.

DISCLOSURE OF THE INVENTION

Technical Problem

In order to accomplish the objects described above, an object of the present invention is to provide a pouch case for a secondary battery, which secures stability by improving nail penetration characteristic and foreign substance resistance, and a pouch-type secondary battery comprising the same.

Technical Solution

In order to accomplish the objects described above, one aspect of the present invention provides a pouch case for a secondary battery consisting of an inner resin layer, an outer resin layer and a metal layer located between the inner resin layer and the outer resin layer, wherein the inner resin layer comprises a porous nonwoven fabric support having a plurality of pores, and a polymer sealant filled in the pores of the non-woven fabric support.

In this case, the pouch case for a secondary battery may further comprise a polymer member layer at one side or both sides of the inner resin layer.

Further, another aspect of the present invention provides a pouch-type secondary battery comprising an electrode assembly; and the pouch case of the present invention containing the electrode assembly.

Advantageous Effects

In the present invention, nail penetration characteristic and foreign substance resistance may be improved by comprising an inner resin layer as one of components of a pouch case for a secondary battery, which comprises a porous non-woven fabric support having a plurality of pores and a polymer sealant filled in the pores of the non-woven fabric support. Thus, a pouch-type secondary battery securing stability can be prepared.

MODE FOR CARRYING OUT THE INVENTION

Hereinafter, the present invention will be described in more detail in order to help the understanding of the present invention. In this case, it should be understood that the terms or words used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

Figure 1:
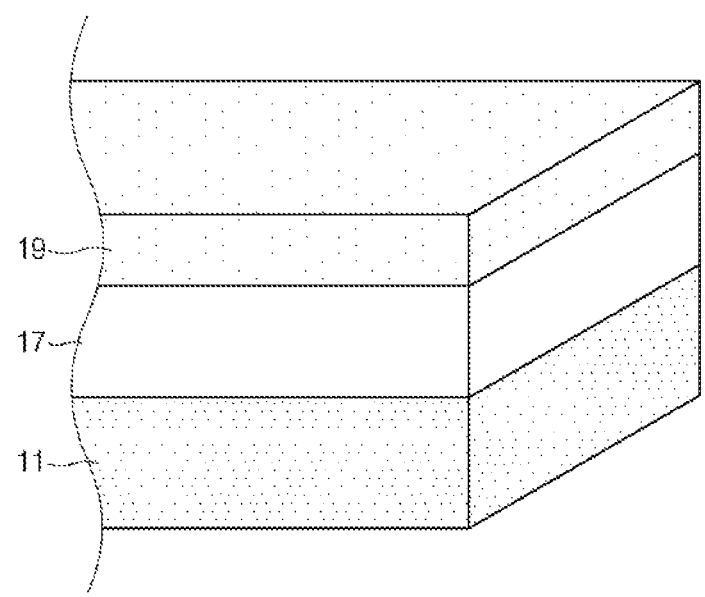
FIG. 1 is a cross-sectional view schematically illustrating a structure of a conventional pouch case composed of an inner resin layer/a metal layer/an outer resin layer.

As illustrated in FIG. 1, a common pouch case for a secondary battery is composed of the inner resin layer 11 playing a role as a sealing material, the metal layer 17 playing a role as a moisture and oxygen barrier layer while maintaining mechanical strength, and the outer resin layer 19 acting as a protection layer.

In this case, the inner resin layer comprises a casted polypropylene (CPP) layer, the metal layer comprises an aluminum layer, and the outer resin layer comprises a multi-layered film structure laminated with polyethylene terephthalate (PET) and a nylon layer.

In this case, in the case of the casted polypropylene layer as the inner resin layer, it has disadvantages that cracks are formed during a thermal fusion process for sealing, or it is easily broken by impact. This may ultimately cause moisture penetration into the pouch-type secondary battery, thereby bringing reduction of stability of the pouch-type secondary battery.

In order to solve the above problems, one embodiment of the present invention provides a pouch case for a secondary battery composed of an inner resin layer, an outer resin layer and a metal layer located between the inner resin layer and the outer resin layer, wherein the inner resin layer comprises:

a porous non-woven fabric support having a plurality of pores, and a polymer sealant filled in the pores of the non-woven fabric support.

Further, the pouch-type secondary battery of the present invention is characterized by comprising: an electrode assembly; and a pouch case containing the electrode assembly.

Hereinafter, the present invention will be described in more detail with reference to the accompanying FIG. 2 and FIG. 3.

Figure 2:
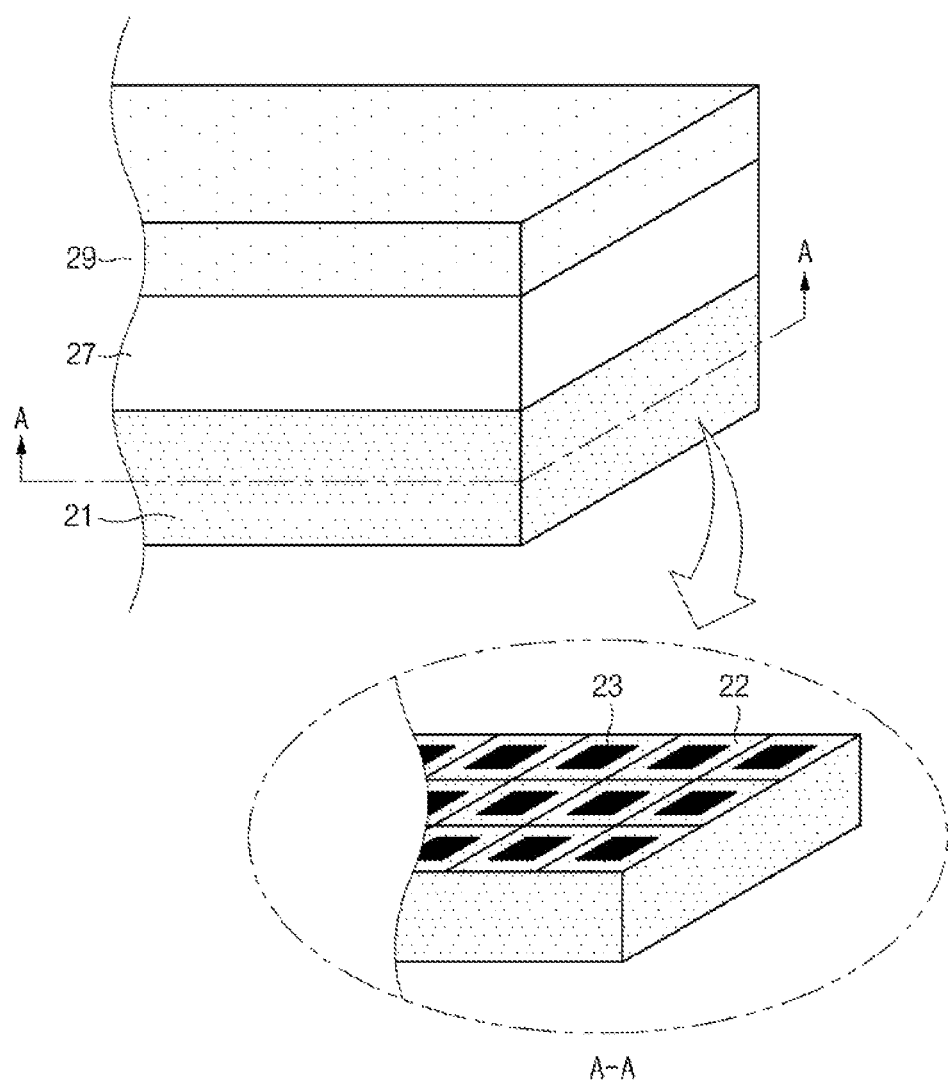
FIG. 2 is a cross-sectional view schematically illustrating a structure of the first pouch case composed of an inner resin layer/a metal layer/an outer resin layer according to Example 1 of the present invention, and a plane view (A-A) for the inner resin layer.

First of all, according to one embodiment of the present invention, as illustrated in FIG. 2, the first pouch case for a secondary battery is composed of the inner resin layer 21 playing a role as a sealing material, the metal layer 27 preventing side reaction by blocking moisture penetration and charge transfer while maintaining mechanical strength, and the outer resin layer 29 acting as a protection layer.

Specifically, the inner resin layer may preferably be composed of the porous non-woven fabric support 22 having a plurality of pores, and the polymer sealant 23 filled in the pores of the non-woven fabric support.

In this case, the porous non-woven fabric support 22 playing a role as a support in the inner resin layer may be prepared by blending polypropylene resin and polyester resin and then spinning thereof.

In general, elongation of the polypropylene resin itself is high as about 200% or higher, but it has a disadvantage that its thermal shrinkage at 180° C. is very high as about 50% or higher. Further, the polyester resin has low thermal shrinkage, but it has a disadvantage of very low elongation.

Accordingly, in the present invention, the polypropylene resin and the polyester resin are blend spun at weight ratio range of 5:5 to 7:3 (polypropylene resin: polyester resin), and specifically at weight ratio of 6:4. Thus the porous non-woven fabric support 22 having high elongation of 200% or higher and thermal shrinkage at 180° C. improved about 5% can be obtained.

In this case, according to the target property value, the content range of the polypropylene resin and the polyester resin may be properly adjusted. Namely, the porous support having improved elongation may be prepared by increasing the content range of the polypropylene resin, or the porous support having improved strength may be prepared by increasing the content range of the polyester resin.

Moreover, in the case of an inner resin layer composed of only the existing polypropylene resin, cracks are formed by foreign substances of micro-level, but in the case of the inner resin layer of the present invention made by blend spinning the polypropylene resin and the polyester resin, the layer comprises the porous non-woven fabric support of a densely interwound net structure having high elongation. Accordingly, when the non-woven fabric support contacts to foreign substances, it forms a structure encasing the foreign substances, thereby minimizing a phenomenon of broken or destruction by the foreign substances. Thus, possibility of direct contact of the foreign substances to the metal layer can be blocked.

Specifically, the inner resin layer of the present invention can be formed in the form of a fibrous porous polymer web having pores (not illustrated) by melting the polypropylene resin and the polyester resin (polyethylene terephthalate (PET) resin), respectively, using a melt-blown method, and then blend spinning thereof at high temperature of about 100° C. to 300° C. (see A-A section of FIG. 2).

In this case, thickness of the porous non-woven fabric support may be 10 μm to 80 μm, and specifically 30 μm to 80 μm. If the thickness is 10 μm or less, there may be disadvantages that nail penetration characteristic is deteriorated because the amount elongated during penetration is small, and it is difficult to perform the sealing process. Further, if the thickness of the porous non-woven fabric support exceeds 80 μm, there is a problem that pouch cell size is increased in contrast to miniaturization and high capacity.

Further, the polymer sealant may comprise polypropylene resin, and preferably be formed by a way of extruding the polypropylene resin and then filling inside of the pores of the porous non-woven fabric support (see A-A section of FIG. 2).

In this case, the method for filling may be performed by using a T-die extruder or an inflation (Inflation 2 Way) method.

Figure 3:
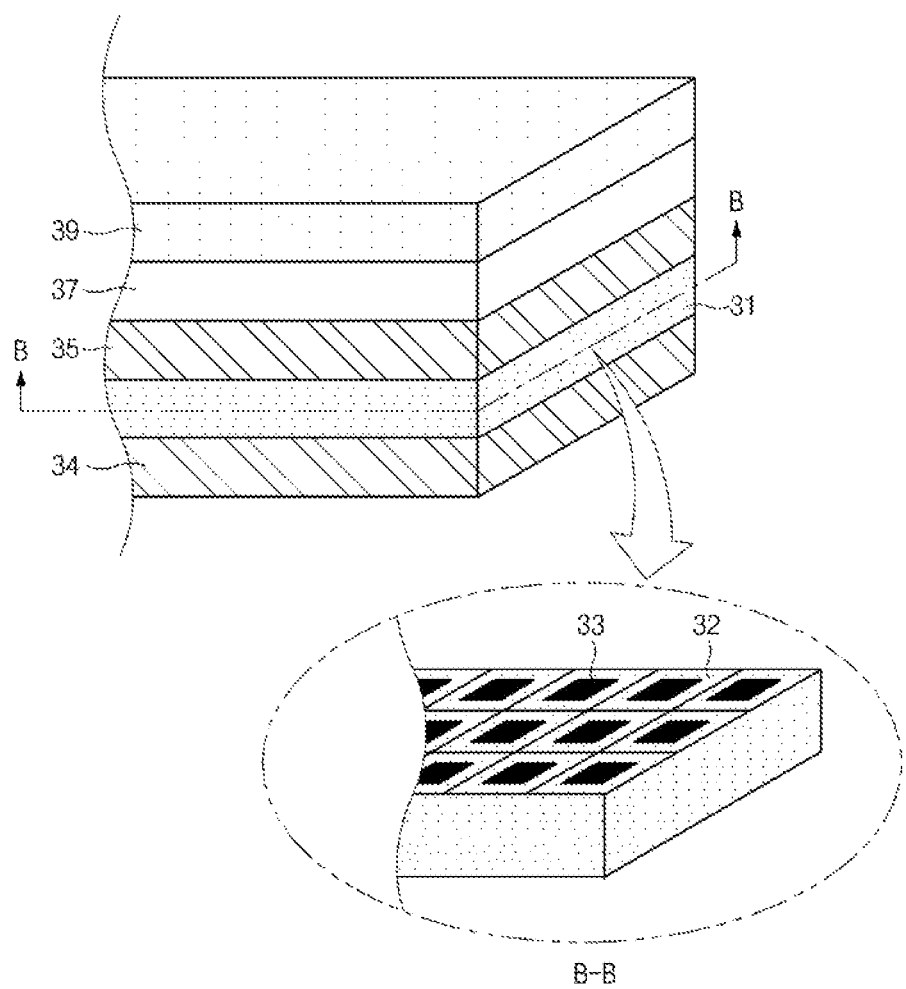
FIG. 3 is a cross-sectional view schematically illustrating a multilayer structure of the second pouch case composed of an inner resin layer/a metal layer/an outer resin layer according to Example 2 of the present invention, and a plane view (B-B) for the inner resin layer.

Further, referring to FIG. 3, in order to further improve elongation, the second pouch case for a secondary battery according to another embodiment of the present invention may further comprise a polymer member layer 34,35 at one side or both sides of the inner resin layer.

Specifically, the pouch case for a secondary battery of the present invention comprises the inner resin layer 31, the metal layer 37 and the outer resin layer 39, and in this case, the inner resin layer may comprise the porous non-woven fabric support 32 having a plurality of pores, and the polymer sealant 33 filled in the pores of the non-woven fabric support (see B-B section of FIG. 3).

Moreover, the second pouch case for a secondary battery of the present invention may comprise the polymer member layer 34,35 composed of polypropylene resin at one side or both sides of the inner resin layer (see FIG. 3).

All of the processes of filling inside of the pores with the polymer sealant or coating/forming the polymer member layer at one side or both sides of the non-woven fabric may be performed by using a T-die extruder or an inflation (Inflation 2 Way) method.

In this case, in the second pouch case of the present invention, thickness of one layer of the polymer member layer may be 20 µm to 40 µm, and preferably 20 µm. Further, in the case of comprising the polymer member layer, thickness of the inner resin layer comprising the porous non-woven fabric support and the polymer member layer may preferably not exceed the maximum thickness of the porous non-woven fabric support, for example, 80 µm.

If the total thickness of the inner resin layer comprising the porous non-woven fabric support and the polymer member layer exceeds 80 µm, there is a problem that pouch cell size is increased in contrast to miniaturization and high capacity.

On the other hand, in the pouch case for a secondary battery of the present invention, the inner resin layer may be connected to the metal layer using a common adhesive used when preparing the pouch case.

In the pouch case of the present invention, the metal layer may be any one selected from the group consisting of an alloy of iron (Fe), carbon (C), chromium (Cr) and manganese (Mn); an alloy of iron (Fe), carbon (C), chromium (Cr) and nickel (Ni); and aluminum (Al), and specifically, it may preferably be composed of aluminum.

Thickness of the metal layer may be 20 µm to 100 µm.

In the pouch case of the present invention, the outer resin layer may comprise a single material or a mixture of at least two selected from the group consisting of polyethylene resin, polypropylene resin, polyethylene terephthalate resin, nylon, low density polyethylene (LDPE) resin, high density polyethylene (HDPE) resin and linear low density polyethylene (LLDPE) resin.

In this case, thickness of the outer resin layer may be 10 µm to 100 µm.

Like this, the pouch case of the present invention can obtain an effect that entanglement is naturally detangled instead of fracture of the pouch case at break point by comprising the porous non-woven fabric support having high elongation, the polymer sealant filled in the pores of the non-woven fabric support, and selectively the polymer member layer. Namely, in a nail test for the pouch case, when the nail penetrates the pouch case, the nail is covered with the inner resin layer thereby preventing penetration. As a result, contact between the electrolyte and the metal layer, or electrode foils can be prevented. Thus, explosion by short and the like can be prevented, thereby securing stability of the pouch-type secondary battery.

Further, another embodiment of the present invention provides a pouch-type secondary battery comprising:

an electrode assembly; and the first or the second pouch case of the present invention containing the electrode assembly.

In this case, the assembly is formed in which a negative electrode comprising a negative electrode active material and a positive electrode comprising a positive electrode active material are insulated and wound while a separator is disposed therebetween.

Specifically, for example, the positive electrode is prepared by coating a mixture of the positive electrode active material, a conductive material and a binder on a positive electrode current collector and drying thereof, and if necessary, a filler may be further added to the mixture.

The positive electrode active material according to the present invention may be used in a mixture with a layered compound such as lithium cobalt oxide ($LiCoO_2$), lithium nickel oxide ($LiNiO_2$) and the like, or a compound substituted with at least one transition metal; lithium manganese oxide ($LiMnO_2$) such as compound of the chemical formula $Li_{1+x}Mn_{2-x}O_4$ (where x ranges from 0 to 0.33), $LiMnO_3$, $LiMn_2O_3$, $LiMnO_2$ and the like; lithium copper oxide ($Li_2CuO_2$); vanadium oxide such as $LiV_3O_8$, $LiFe_3O_4$, $V_2O_5$, $Cu_2V_2O_7$ and the like; lithiated nickel oxide expressed by the chemical formula $LiNi_{1-x}M_xO_2$ (where M is Co, Mn, Al, Cu, Fe, Mg, B or Ga, and x ranges from 0.01 to 0.3); lithium manganese composite oxide expressed by the chemical formula $LiMn_{2-x}M_xO_2$ (where M is Co, Ni, Fe, Cr, Zn or Ta, and x ranges from 0.01 to 0.1) or $Li_2Mn_3MO_8$ (where M is Fe, Co, Ni, Cu or Zn); $LiMn_2O_4$, in which a part of lithium of the chemical formula is substituted with alkali earth metal ions; a disulfide compound; and a compound having a lithium intercalation material as a main component such as $Fe_2(MoO_4)_3$ or a composite oxide formed in combination thereof.

In general, the positive electrode current collector is made to have thickness of 3 µm to 500 µm. There is not particular limitation to this positive electrode current collector so long as it does not cause chemical changes in the batteries and has high conductivity, and for example, it may be stainless steel, aluminum, nickel, titanium, calcined carbon, or aluminum or stainless steel that is surface-treated with one of carbon, nickel, titanium, silver and the like. The current collector may have a fine roughness surface to increase adhesive strength of the positive electrode active material, and it may have various shapes such as a film, a sheet, a foil, a net, a porous body, a foamed body, a non-woven body and the like.

The conductive material is commonly added in an amount of 1 wt % to 50 wt %, based on the total weight of the mixture comprising the positive electrode active material. There is not particular limitation to this conductive material so long as it does not cause chemical changes in the batteries and has conductivity. For example, it may be a conductive material such as: graphite such as natural graphite, artificial graphite and the like; carbon black such as acetylene black, Ketjen black, channel black, furnace black, lamp black, thermal black and the like; a conductive fiber such as a carbon fiber, a metal fiber and the like; metal powder such as fluoro carbon powder, aluminum powder, nickel powder and the like; conductive whisker such as zinc oxide, potassium titanate and the like; a conductive oxide such as titanium oxide and the like; and polyphenylene derivatives.

The binder is a component that assists in the binding between the active material and the conductive material and in the binding with the current collector. The binder is commonly added in an amount of 1 wt % to 50 wt %, based on the total weight of the mixture comprising the positive electrode active material. Examples of the binder may be polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butadiene rubber, fluoro rubber, various copolymers and the like.

The filler is a component selectively used to inhibit the expansion of the positive electrode. There is no particular limit to the filler so long as it is a fibrous material not causing chemical change in the batteries, and for example, it may be an olefin-based polymer such as polyethylene, polypropylene and the like; a fibrous material such as a glass fiber, a carbon fiber and the like.

Further, the negative electrode is prepared by coating a negative electrode material on a negative electrode current collector and drying thereof. If necessary, the components previously described may be further included.

The negative electrode current collector is generally made to have thickness of 3 µm to 500 µm. This negative electrode current collector is not particularly limited so long as it has conductivity without causing chemical change in the batteries, and for example, it may be copper, stainless steel, aluminum, nickel, titanium, calcined carbon, copper or stainless steel that is surface-treated with carbon, nickel, titanium, silver or the like, aluminum-cadmium alloy and the like. Further, like the positive electrode current collector, it may have a fine roughness surface to reinforce bonding strength of the negative electrode active material, and it may be used in various shapes such as a film, a sheet, a foil, a net, a porous body, a foamed body, a non-woven body and the like.

The negative electrode material comprises amorphous carbon or crystalline carbon, and specifically, it may be carbon such as hard carbon, graphite-based carbon and the like; a metal composite oxide such as $Li_xFe_2O_3(0 \leq x \leq 1)$, $Li_xWO_2(0 \leq x \leq 1)$, $Sn_xMe_{1-x}Me'_yO_z$ (Me: Mn, Fe, Pb, Ge; Me': Al, B, P, Si, Groups I, II and III elements, halogen; $0 < x \leq 1$; $1 \leq y \leq 3$; $1 \leq z \leq 8$) and the like; a lithium metal; a lithium alloy; a silicon-based alloy; a tin-based alloy; an oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$ and the like; a conductive polymer such as polyacetylene and the like; a Li—Co—Ni-based material; and the like.

As the separator insulates the positive electrode and the negative electrode between the electrodes, all of a generally known polyolefin-based separator, a composite separator, in which an organic/inorganic composite layer is formed on an olefin-based base material, and the like may be used, but not limited thereto.

The electrode assembly having the structure described above is contained in the pouch case, and then an electrolyte is injected thereinto to prepare a battery.

The electrolyte according to the present invention is a lithium salt-containing non-aqueous electrolyte that is composed of a non-aqueous electrolyte and lithium. As the non-aqueous electrolyte, a non-aqueous electrolyte, a solid electrolyte, an inorganic solid electrolyte and the like may be used.

Examples of the non-aqueous electrolyte may be an aprotic organic solvent such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydroxyfuran, 2-methyl tetrahydrofuran, dimethylsulfoxide, 1,3-dioxolane, foimamide, dimethylformamide, dioxolane, acetonitrile, nitromethane, methyl formate, methyl acetate, phosphate triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate and the like.

Examples of the organic solid electrolyte may be polyethylene derivatives, polyethylene oxide derivatives, polypropylene oxide derivatives, a phosphate ester polymer, poly agitation lysine, polyester sulfide, polyvinyl alcohol, polyvinylidene fluoride, a polymer containing an ionic dissociation group and the like.

Examples of the inorganic solid electrolyte may be nitrides, halides, sulfates of Li such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$ and the like.

The lithium salt is a material that is readily dissolved in the non-aqueous electrolyte, and for example, it may include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium 4-phenyl borate, imide and the like.

Further, in order to enhance charge/discharge characteristics and flame retardancy and the like, for example, pyridine, triethylphosphite, triethanolamine, cyclic ether, ethylenediamine, n-glyme, hexaphosphoric triamide, nitrobenzene derivatives, sulfur, a quinone imine dye, N-substituted oxazolidinone, N,N-substituted imidazolidine, ethylene glycol dialkyl ether, ammonium salts, pyrrole, 2-methoxy ethanol, aluminum trichloride and the like may be added to the non-aqueous electrolyte. In some cases, in order to give incombustibility, halogen-containing solvents such as carbon tetrachloride, ethylene trifluoride and the like may be further included, and in order to improve high-temperature storage characteristic, carbon dioxide gas may also be further included.

On the other hand, the pouch-type secondary battery as described above may preferably be a lithium secondary battery, but not limited thereto.

The pouch-type secondary battery of the present invention may be used as a unit cell of a battery module, a power source of medium and large sized devices.

As previously described, in the detailed description of the invention, having described the detailed embodiments of the invention, it should be apparent that modifications and variations can be made without deviating from the spirit or scope of the invention. The technical idea of the present invention should not be limited to the aforesaid embodiments of the present invention, and should be determined within the scope of the appended claims and their equivalents.

EXAMPLE

Example 1

(Preparation of Inner Resin Layer)

Polypropylene resin and polyester resin (PET) were melt, and then the polypropylene resin and the polyester resin were blend spun at about 220° C. at weight ratio of 6:4 to obtain a porous non-woven fabric support in thickness of 80 µm.

Then, after melting polypropylene resin, the polypropylene resin was filled in the pores of the non-woven fabric support using a T-DIE (Doctor blade) method to prepare an inner resin layer sheet in the total thickness of about 80 µm (see A-A of FIG. 2).

(Preparation of First Pouch Case)

The inner resin layer sheet was attached to one side of an aluminum thin film (40 μm) as a metal layer, and then a PET/nylon layer (40 μm) as an outer resin layer was attached to the other side of the metal layer to prepared the first sheet for a pouch case (see FIG. 2).

Example 2

(Preparation of Inner Resin Layer)

Polypropylene resin and polyester resin (PET) were melt, and then the polypropylene resin and the polyester resin were blend spun at about 220° C. at weight ratio of 5:5 to obtain a porous non-woven fabric support in thickness of 40 μm.

Then, after melting polypropylene resin, the polypropylene resin was filled in the pores of the non-woven fabric support using a T-DIE (Doctor blade) method.

Then, polypropylene resin (20 μm) was coated on both sides of the porous non-woven fabric support to prepare an inner resin layer sheet in the total thickness of about 80 μm (see B-B of FIG. 3).

(Preparation of Second Pouch Case)

The inner resin layer sheet was attached to one side of an aluminum thin film (40 μm) as a metal layer, and then a PET/nylon layer (40 μm) as an outer resin layer was attached to the other side of the metal layer to prepared the second sheet for a pouch case (see FIG. 3).

Comparative Example 1

Polypropylene single resin layer sheet (80 μm) was attached on an aluminum thin film (40 μm) as a metal layer, and then a PET/nylon layer (40 μm) as an outer resin layer was attached thereon to prepared a sheet for a pouch case (see FIG. 1).

TEST EXAMPLE

Test Example 1

A thermal shrinkage test and a stability test (nail penetration test after full charging) were performed to the sheets for a pouch case prepared in Examples 1 and 2 and Comparative Example 1, respectively.

As a result, in the case of the sheets for a pouch case of Examples 1 and 2, it was observed that the nail did not penetrate because it was covered with the non-woven fabric having high elongation when it came out, but in the case of the sheet for a pouch case of Comparative Example 1, it was observed that surroundings of the pouch case were cracked as the nail easily penetrated (see the following Table 1).

Further, in the case of the sheets for a pouch case of Examples 1 and 2, changes were not observed with naked eyes because the thermal shrinkage at 180° C. was 10% or lower, but in the case of the sheet for a pouch case of Comparative Example 1, it could be confirmed that the thermal shrinkage was about 50% or higher (see the following Table 1).

TABLE 1

|  | Stability Test | Thermal Shrinkage |
| --- | --- | --- |
| Example 1 | ○ | <10% |
| Example 2 | ○ | <10% |
| Comparative Example 1 | X | 50%< |

○: Case that the nail did not penetrate the sheet
X: Case that the nail penetrated the sheet Through the test as described above, it can be predicted that the pouch-type secondary battery comprising the pouch-type case of the present invention has a great effect in terms of stability improvement.

The invention claimed is:

1. A pouch case for a secondary battery composed of an inner resin layer, an outer resin layer and a metal layer located between the inner resin layer and the outer resin layer,
wherein the inner resin layer comprises:
a porous non-woven fabric support having a plurality of pores, and
a polymer sealant filled in the pores of the non-woven fabric support,
wherein the non-woven fabric is formed by blend spinning of polypropylene resin and polyester resin, and a weight ratio of the polypropylene resin:the polyester resin is in a range of 5:5 to 7:3.

2. The pouch case for a secondary battery of claim 1, wherein the weight ratio of the polypropylene resin:the polyester resin is in range of 6:4.

3. The pouch case for a secondary battery of claim 1, wherein elongation of the porous non-woven fabric support is 200% or higher.

4. The pouch case for a secondary battery of claim 1, wherein thickness of the porous non-woven fabric support is 10 μm to 80 μm.

5. The pouch case for a secondary battery of claim 1, wherein the polymer sealant comprises polypropylene resin.

6. The pouch case for a secondary battery of claim 1, wherein the inner resin layer further comprises a polymer member layer at least one side or both sides of the porous non-woven fabric support.

7. The pouch case for a secondary battery of claim 6, wherein the polymer member layer consists of polypropylene resin.

8. The pouch case for a secondary battery of claim 6, wherein thickness of the polymer member layer is 20 μm to 40 μm.

9. The pouch case for a secondary battery of claim 6, wherein the total thickness of the inner resin layer comprising the porous non-woven fabric support and the polymer member layer does not exceed 80 μm.

10. The pouch case for a secondary battery of claim 1, wherein the metal layer is at least one selected from the group consisting of an alloy of iron (Fe), carbon (C), chromium (Cr) and manganese (Mn); an alloy of iron (Fe), carbon (C), chromium (Cr) and nickel (Ni); and aluminum (Al).

11. The pouch case for a secondary battery of claim 10, wherein the metal layer is aluminum.

12. The pouch case for a secondary battery of claim 1, wherein thickness of the metal layer is 20 μm to 100 μm.

13. The pouch case for a secondary battery of claim 1, wherein the outer resin layer comprises a single material or a mixture of at least two selected from the group consisting of polyethylene resin, polypropylene resin, polyethylene terephthalate resin, nylon, low density polyethylene resin, high density polyethylene resin and linear low density polyethylene resin.

14. The pouch case for a secondary battery of claim 1, wherein thickness of the outer resin layer is 10 μm to 100 μm.

15. A pouch-type secondary battery comprising:
an electrode assembly; and
a pouch case containing the electrode assembly,
wherein the pouch case comprising the pouch case for a secondary battery of claim 1.

* * * * *